Figure 1:
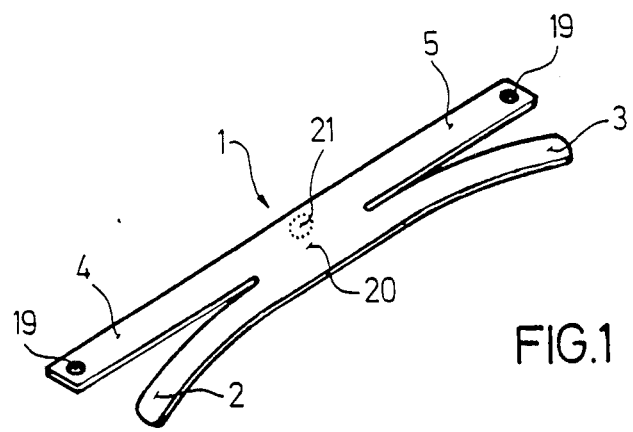

United States Patent [19]

Schoettle

[11] Patent Number: 4,619,420
[45] Date of Patent: Oct. 28, 1986

[54] TAPE CASSETTE

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 744,202

[22] Filed: Jun. 13, 1985

[30] Foreign Application Priority Data

Jun. 15, 1984 [DE] Fed. Rep. of Germany ... 8418179[U]

[51] Int. Cl.⁴ .......................... G03B 1/04; G11B 15/32; G11B 23/04
[52] U.S. Cl. ....................................... 242/198; 360/132
[58] Field of Search ........................ 242/192, 197–200, 242/55.19 A; 360/96.3, 132, 137

[56] References Cited

U.S. PATENT DOCUMENTS

| 4,368,860 | 1/1983 | Goto | 242/199 |
| 4,449,676 | 5/1984 | Ogata et al. | 242/198 |
| 4,496,118 | 1/1985 | Oishi et al. | 242/198 |
| 4,500,050 | 2/1985 | Oishi et al. | 242/198 |

FOREIGN PATENT DOCUMENTS 8335294  3/1984  Fed. Rep. of Germany ...... 242/199

Primary Examiner—Leonard D. Christian
Attorney, Agent, or Firm—Keil & Weinkauf

[57] ABSTRACT

A pressure spring for reels in tape cassettes, for example video cassettes, possesses fastening means which are arranged in the area of a depression in the particular reel to which pressure is to be applied. In practice, the pressure spring is designed for a two-reel cassette and is in the form of a two-armed spring having fastening arms roughly parallel to these arms.

9 Claims, 4 Drawing Figures

TAPE CASSETTE

This invention relates to a tape cassette comprising a housing having a housing part, at least one flanged tape reel and a pressure spring having one or two fastening arms fastening the pressure spring to the said housing part and one or two pressure spring arms for exerting a spring force on the tape reel(s) in the direction of a defined operating position, said at least one tape reel having a depression in the flange facing the said housing part. The invention also relates to a pressure spring for incorporation in a tape cassette of the kind referred to.

Pressure springs for tape cassettes are sometimes referred to as reel pressure springs, and are intended for all commercially available two reel video cassettes of the VHS and Beta video systems, as well as for a novel 8 mm video cassette. In all these known cassettes, the coplanar reels are pressed toward the lower half of the housing by curved reel pressure springs which are fastened inside the upper half of the housing and are punched out from spring sheet. Hence, when such a cassette is placed in the appropriate playback apparatus, the reels lie evenly on the hub holders of the apparatus and run smoothly when the tape is played back. All such reel pressure springs have the same function, but their size and spring power differ since the particular cassettes, their reels and their reel spacings differ in size.

Each pressure spring is usually manufactured by punching it out of spring steel strip material, in an advantageous manner which saves material and enables a rapid punching sequence.

Commercial video cassettes are known which contain pressure springs which are attached outside the reel space and therefore are very broad and utilise substantial amounts of material.

Furthermore, German Utility Model No. 8,335,294 (corresponding to GB Patent Application No. 8430901) discloses a pressure spring for VHS cassettes, which spring can be fastened in the region of a cassette window by clamping or welding. In an advantageous embodiment, the pressure spring and the window possess interlocking teeth in order to make it possible for the pressure spring to be fastened within the area of movement of the tape reels. However, a precondition in this case is that the upper part of the cassette housing must be sufficiently thick. Furthermore, the required modifications to the shape of the cassette window are expensive.

It is an object of the present invention to provide a simple pressure spring which is economical to produce and which can also be used in thin-walled tape cassettes thereby permitting the production of reliably operating and more economical tape cassettes.

According to the invention there is provided a tape cassette of the kind referred to, the or each reel having a depression in the at least one flange facing the said housing part and an end region of the or each fastening arm possessing fastening means for fastening the pressure spring to the said housing part in an area or areas facing the depression(s) provided in the tape reel or reels.

This provides a simple means of fastening in spite of the simple form of the spring and the tape cassette, and without any modifications to the cassette housing or to the tape reels.

In another embodiment, the fastening means can be provided within, for example, a circular ring area whose diameter is smaller than half the length of a spring arm. This takes into account, for example, the shape of existing video tape reels.

In another embodiment, the diameter of the circular ring area is about one quarter of the length of a spring arm.

Advantageously, the fastening arms can extend substantially parallel to the pressure spring arms and be connected to one another via a middle section.

This results in a very advantageous embodiment of the spring, with little or virtually no loss of material. This spring can advantageously be produced as a single piece.

The present invention furthermore relates to the advantageous embodiment of the pressure spring itself with the embodiments of tape cassettes discussed above.

The novel embodiments of pressure springs and tape cassettes are described below with reference to a drawing.

Figure 2:
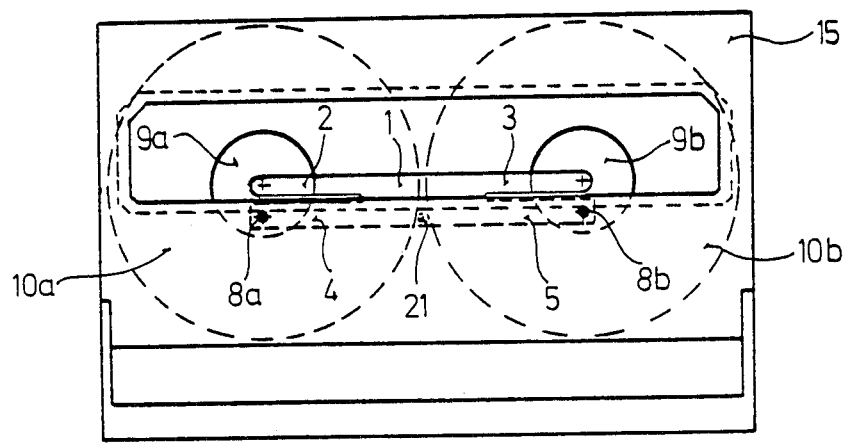
Figure 3:
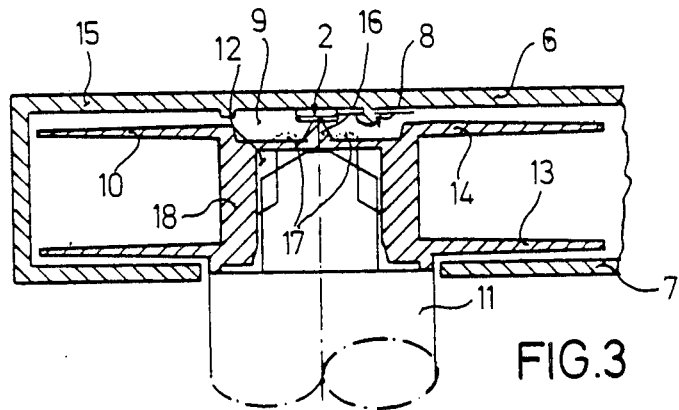
Figure 4:
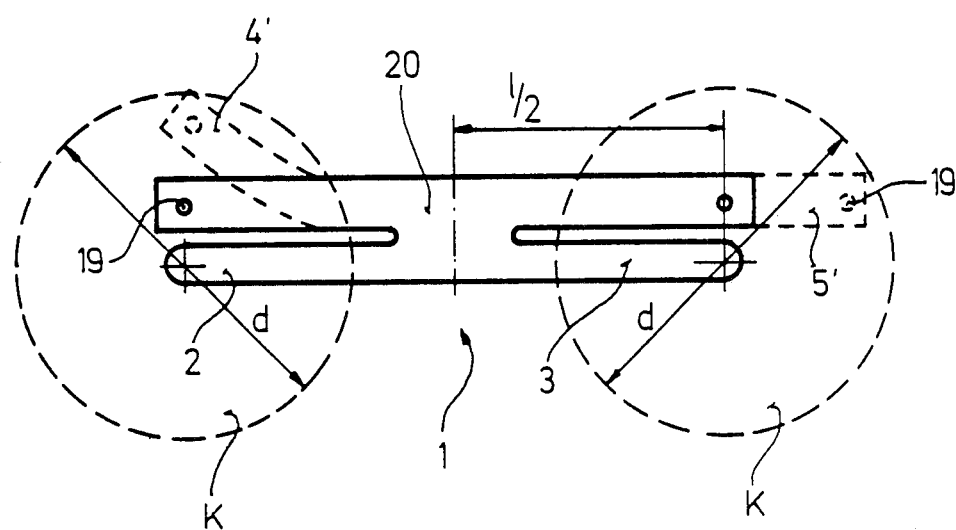

FIG. 1 shows a perspective view of a reel pressure spring in the form of a two-armed spring with two fastening arms, FIG. 2 shows the reel pressure spring according to FIG. 1 in an 8 mm video cassette, FIG. 3 shows a section through a tape reel, an end of a pressure spring or a reel fastening, and the cassette housing, and FIG. 4 shows a plan view of the reel pressure spring.

The reel pressure spring 1 consists of two pressure spring arms 2 and 3 bent downward and two flat fastening arms 4 and 5. The fastening arms 4 and 5 possess, at their ends, means for fastening to corresponding housing parts 6 and 7 of the tape cassette 15, for example holes, beads, bent edges, etc., which correspond to pins, depressions or projections on the housing (parts 6 and 7), and can be connected to the housing parts by welding, inserting and/or hooking in. As shown in FIGS. 2 and 3, these fastening means 8 on the housing are, according to the invention, located in the region of the particular annular depression 9a or 9b of the reel 10a or 10b, respectively. This arrangement has the advantage that the fastening means 8, for example a rivet deformed plastically by means of ultrasound, can also be of a very robust form without interfering with the running of the reel, as such a rivet at least partly extends into the depression.

The spindle 11 of the apparatus engages the drive recess 12 of the reel 10, this recess extending here from the lower flange 13 into the hub 18. The depression 9 opposite this recess contains a central projection 16 which serves as a pressure point for the tape reel. In FIG. 3, the end of the pressure spring arm 2 lies on the projection 16. The fastening rivet 8 is displaced radially from this so that no interference with reel rotation can occur. Rotation is not hindered even when fastening projections 17 are provided, by means of which flange 14 is fastened to hub 18.

FIG. 4 shows the pressure spring 1 in plan view, in which the effective pressure points are marked with crosses which represent the centers of the circular areas K. Their diameters d determine the area in which it is possible for the fastening means on the fastening arms to be located, and the upper limit to this area is determined by half of the total length L of the double spring 1. This applies where the reels are very close together to permit a very compact construction of the cassette, and hence the distance between the mid-points of the reels (projections 16) roughly corresponds to the reel diameter ($d \approx L/2$). 4' and 5' in FIG. 4 illustrate alternative forms of the fastening arms 4 and 5 of the spring 1. Form 4 is bent away from the pressure arm 2, and form 5 is extended beyond the pressure arm 3. In all embodiments, the fastening means of the holes 19 are located within the circular area or, more accurately, circular ring area K, and hence within the particular reel depression.

Pressure spring arms 2 and 3 and fastening arms 4 and 5 or 4' and 5' are connected to one another via a middle sectin 20 so that the spring can be manufactured in one piece. It is of course also possible, for example, for the middle section 20 to be in the form of overlapping extensions of the pairs of arms, and to be connected by means of a rivet 21 (indicated by a broken line in FIG. 1). The rivet 21 should be located in an area between the reels 10a and 10b, as indicated in FIG. 2. In principle, it is of course also possible to arrange a single spring for a single tape reel in the novel position of a reel depression, as is the case, for example, for a single-reel tape cassette or film cassette. It is also possible, in a cassette which can be turned over for recording/playback operation, to mount one or more such springs, designed and arranged according to the invention, on each side of one or two reels and thus, if necessary, hold the reel in a floating position.

The springs described are generally manufactured from spring steel sheet, but springs having the same action and produced from spring steel wire or suitable metal alloys or plastics are also conceivable.

Although only a two-reel spring has been described, an appropriately modified single-reel spring embodiment can be derived from this without difficulty by the skilled worker.

I claim:

1. A tape cassette comprising a housing having a housing part, at least one flanged tape reel and a pressure spring having at least one fastening arm fastening the pressure spring to the said housing part and at least one pressure spring arm for exerting a spring force on the tape reel(s) in the direction of a defined operating position, said at least one tape reel having a depression in the flange facing the said housing part and an end region of the at least one fastening arm possessing fastening means for fastening the pressure spring to the said housing part in an area facing the depression provided in the at least one tape reel.

2. A tape cassette according to claim 1, wherein two tape reels are provided and the pressure spring has two fastening arms and two pressure spring arms.

3. A tape cassette as claimed in claim 1 wherein the fastening means of the or each fastening arm is arranged to face a depression in the reel flange which is determined by a circular ring area having a diameter smaller than half the spring arm length and having its center on the end of the pressure spring arm allocated thereto.

4. A tape cassette as claimed in claim 3, wherein the diameter is approximately one quarter of the spring arm length.

5. A tape cassette as claimed in claim 2, wherein the fastening arms extend at least substantially parallel to the pressure spring arms in the form of double arms and wherein the pressure spring has a middle section at which the fastening arms and the spring arms are connected together.

6. A pressure spring for use in a tape cassette as claimed in claim 1, wherein the fastening means are arranged on the fastening arms within a circular ring area whose diameter is smaller than half the spring arm length and whose center is on the end of the pressure spring arm allocated thereto.

7. A pressure spring as claimed in claim 6, wherein the diameter (d) of the circular ring area is about one fourth of the spring arm length ($\frac{1}{4}$).

8. A pressure spring as claimed in claim 6, wherein the fastening arms (4, 5) extend substantially parallel to the pressure spring arms (2, 3) in the form of double arms, and wherein the pressure spring has a middle section (20) at which the fastening arms and the spring arms are connected together.

9. A pressure spring as claimed in claim 8, wherein the spring arms are integral with the fastening arms.

* * * * *